(12) United States Patent
Lehmann

(10) Patent No.: US 7,483,150 B2
(45) Date of Patent: Jan. 27, 2009

(54) MEASURING DEVICE HAVING AN OPTICAL PROBE TIP

(75) Inventor: Peter Lehmann, Gottingen (DE)

(73) Assignee: Carl Mahr Holding GmbH, Gottingen (DE)

( * ) Notice: Subject to any disclaimer, the term of this patent is extended or adjusted under 35 U.S.C. 154(b) by 124 days.

(21) Appl. No.: 11/579,418

(22) PCT Filed: Apr. 20, 2005

(86) PCT No.: PCT/EP2005/004223
§ 371 (c)(1),
(2), (4) Date: Nov. 2, 2006

(87) PCT Pub. No.: WO2005/108919
PCT Pub. Date: Nov. 17, 2005

(65) Prior Publication Data
US 2008/0030743 A1 Feb. 7, 2008

(30) Foreign Application Priority Data
May 6, 2004 (DE) .................. 10 2004 022 454

(51) Int. Cl.
*G01B 11/24* (2006.01)
(52) U.S. Cl. ............................................. 356/601
(58) Field of Classification Search ............... None
See application file for complete search history.

(56) References Cited
U.S. PATENT DOCUMENTS
5,785,651 A * 7/1998 Kuhn et al. ............ 600/310
6,674,572 B1 * 1/2004 Scheruebl et al. ........ 359/368
2004/0174537 A1 9/2004 Ferger

FOREIGN PATENT DOCUMENTS

| DE | 1 473 780 | 3/1969 |
|---|---|---|
| DE | 33 22 714 A1 | 1/1985 |
| DE | 199 07 289 C1 | 8/2000 |
| GB | 2 077 421 A | 12/1981 |
| WO | WO 98/44375 | 10/1998 |
| WO | WO 03/008905 | 5/2003 |

OTHER PUBLICATIONS

Tiziani, H.J. et al., "Three-Dimensional Image Sensing by Chromatic Confocal Microscopy," Applied Optics, Optical Society of America, Washington, US, vol. 33, No. 10, Apr. 1, 1994, pp. 1838-1843.

* cited by examiner

*Primary Examiner*—Michael P Stafira
(74) *Attorney, Agent, or Firm*—Venable, LLP; Ralph P. Albrecht; Ryan M. Flandro

(57) ABSTRACT

A measuring device (1) for measuring the shape, contour and/or roughness of a workpiece is based on a contact-less optical probe having a large numeric aperture. The probe has at least two different focal points with which at least two photo receptors are associated. The latter generate a differential signal for controlling a positioning device (13) for tracking the optical probe in such a manner that the workpiece surface is maintained within the measuring range of the probe. The differential signal is proven to result in a rapid and accurate tracking of the position of the sensor arrangement (3).

13 Claims, 4 Drawing Sheets

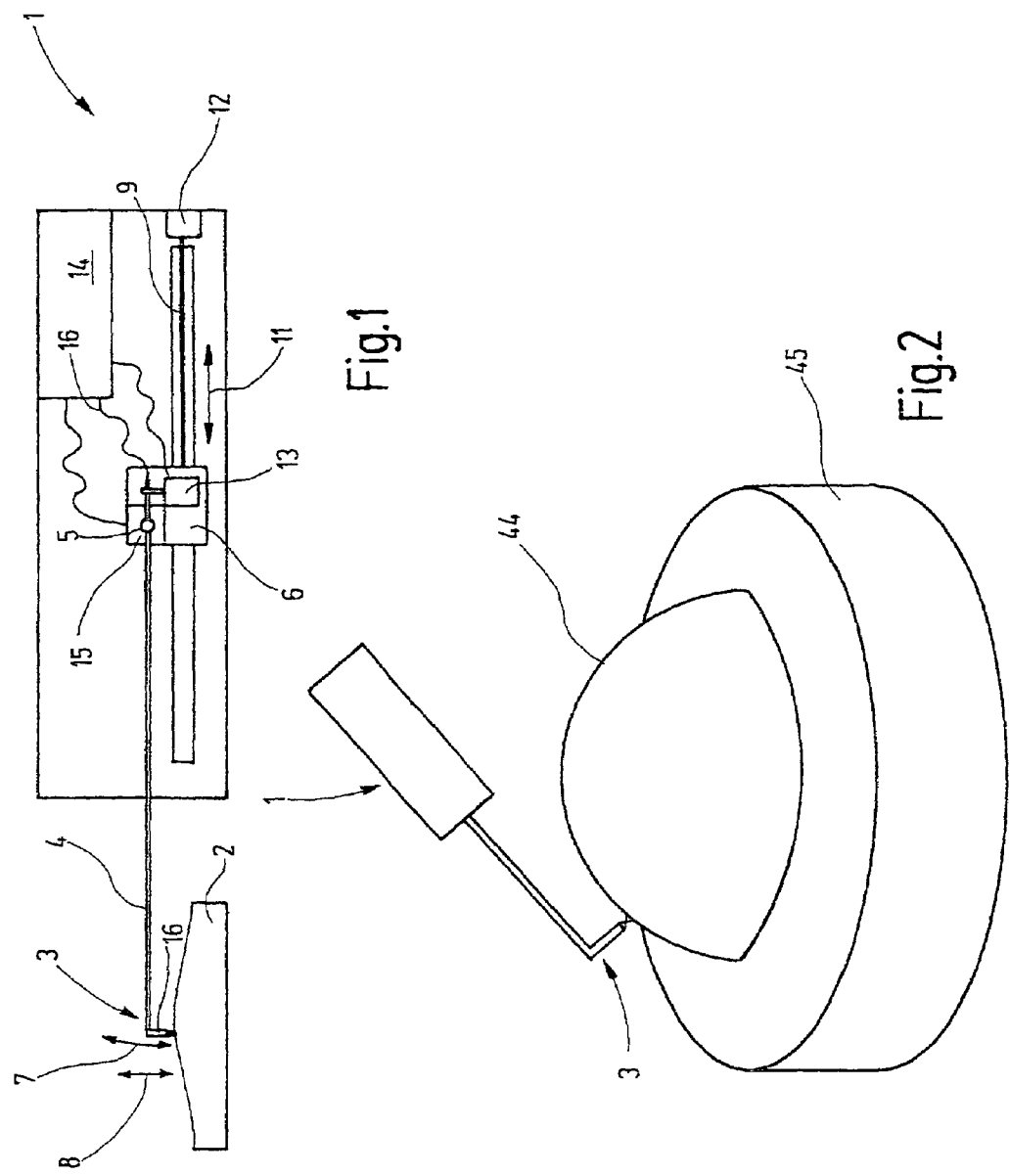

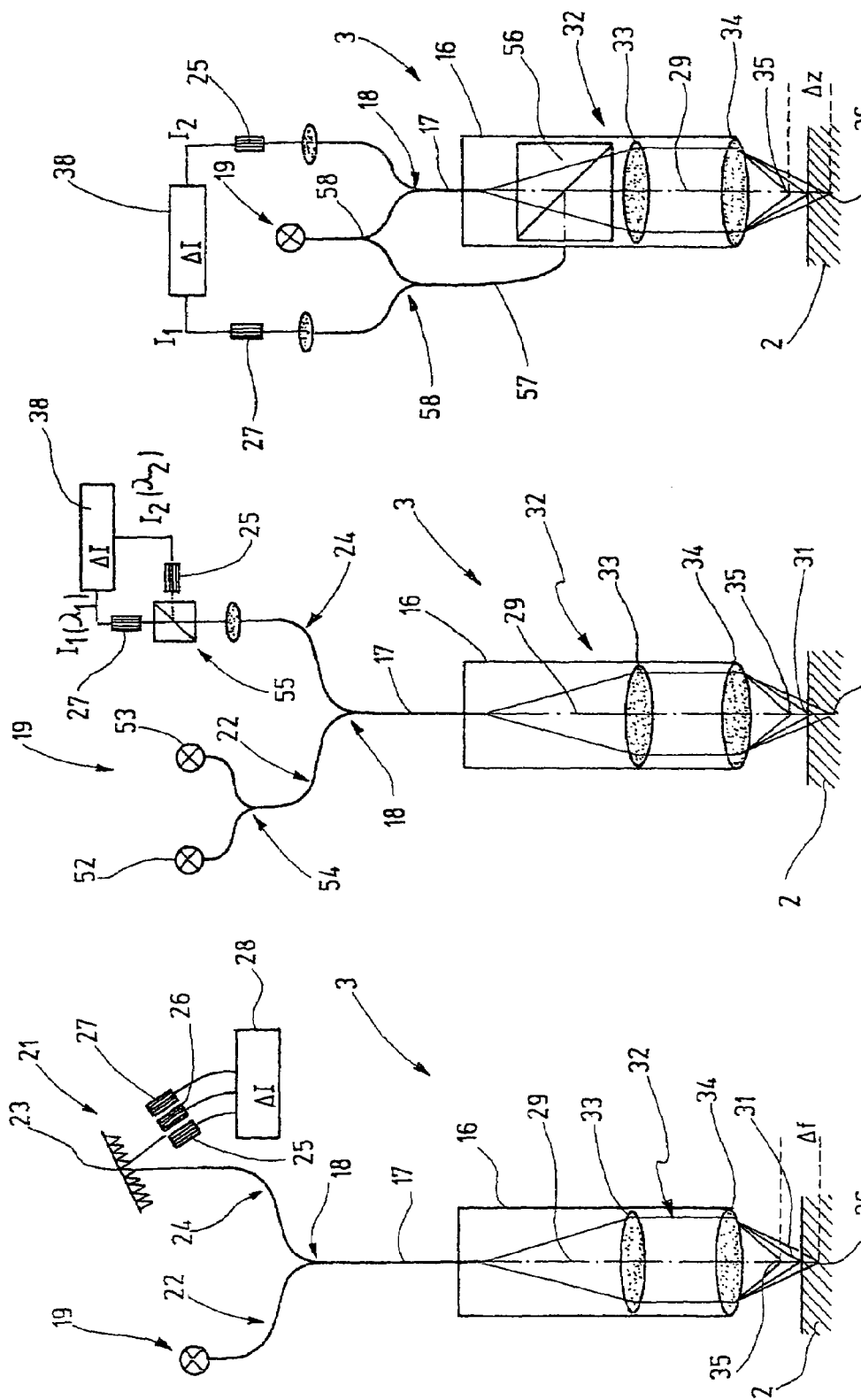

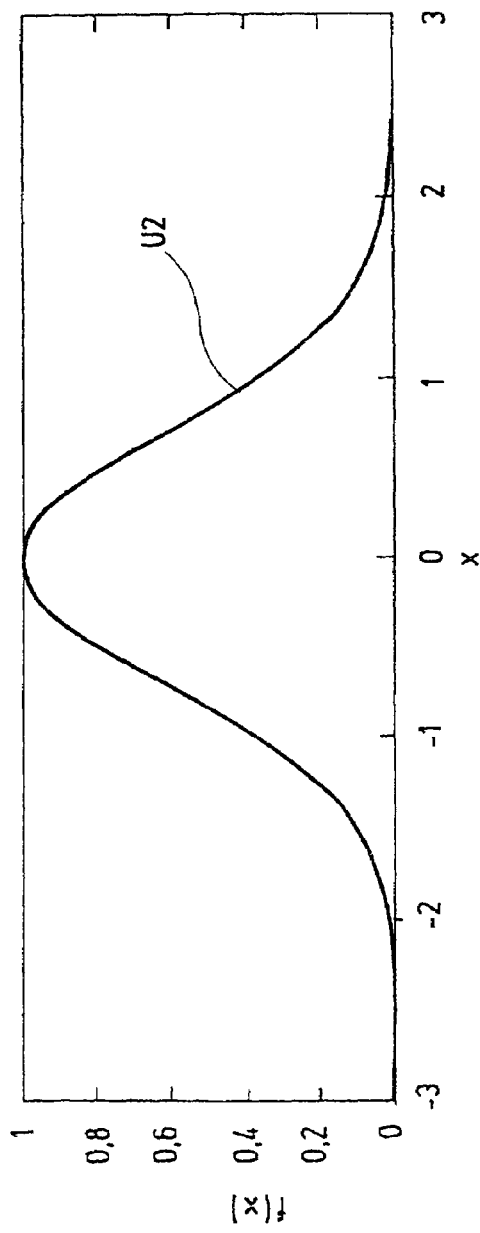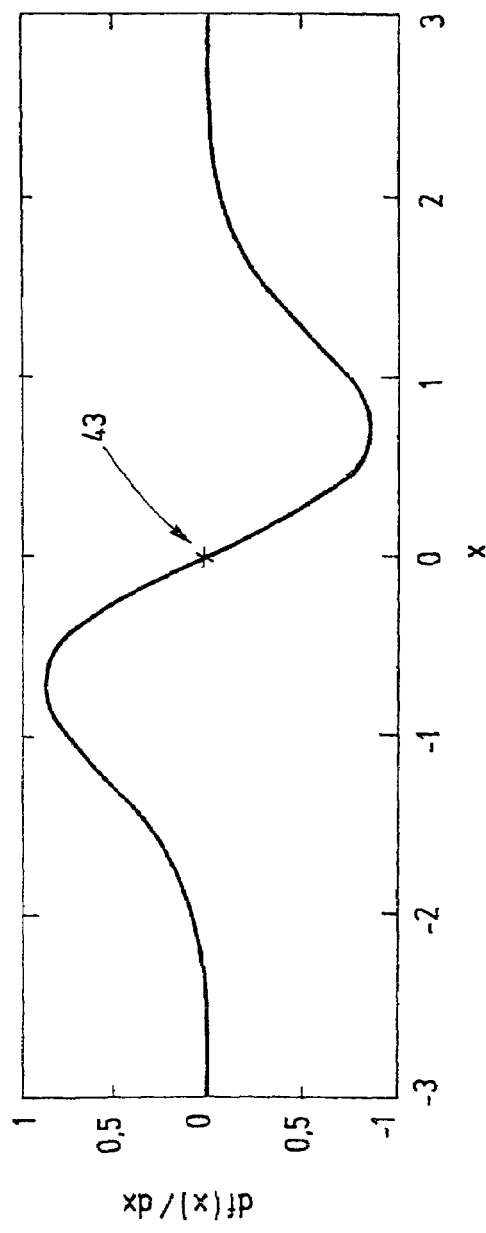

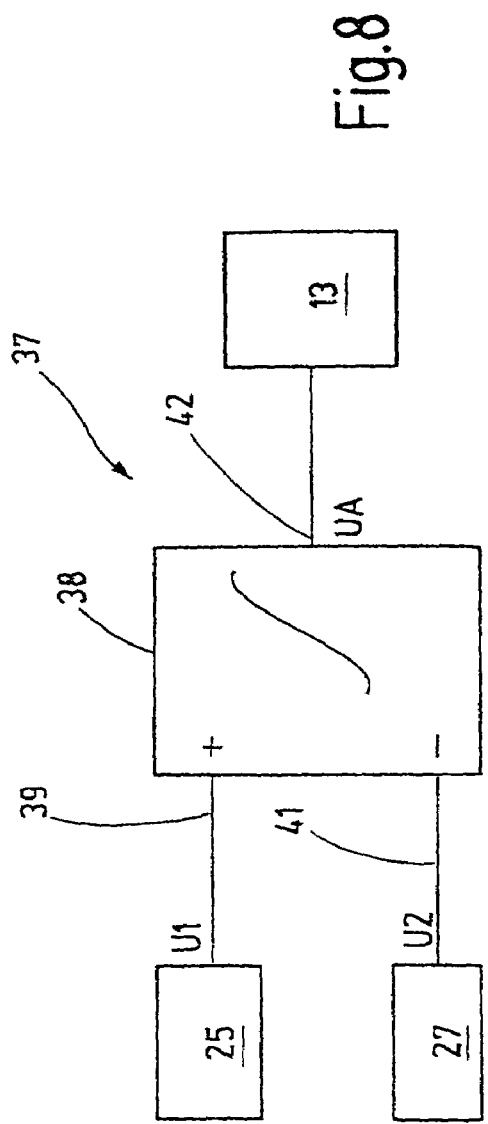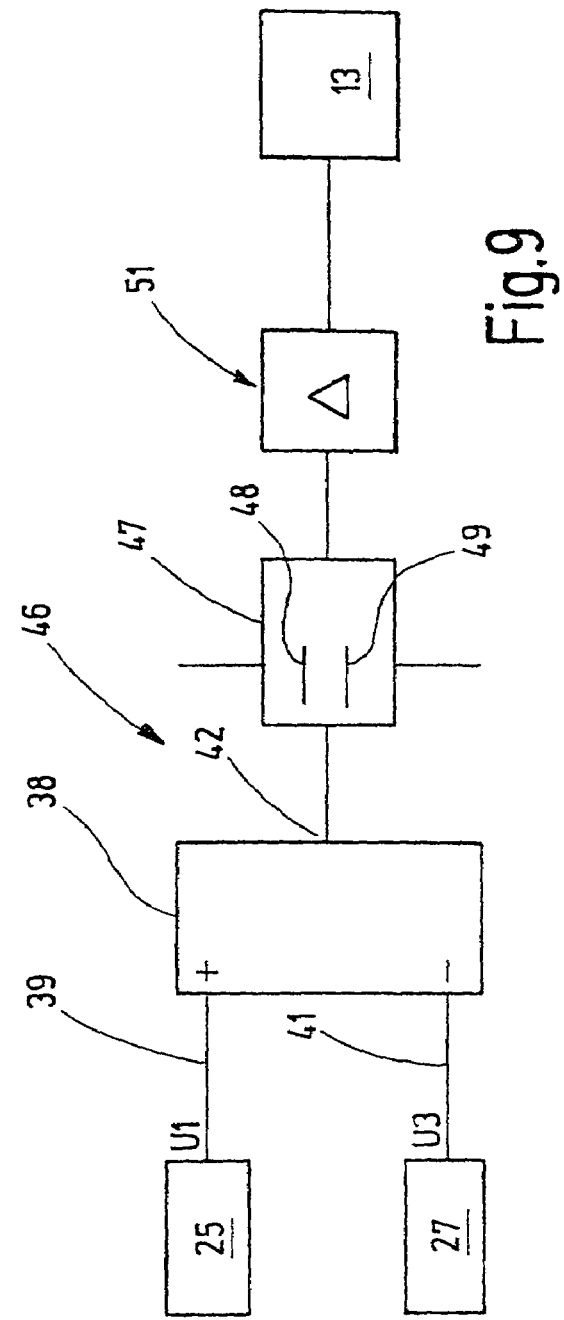

MEASURING DEVICE HAVING AN OPTICAL PROBE TIP

The invention relates to a measuring device, particularly for measuring roughness, contours or shapes.

For measuring roughness, shapes or contours, heretofore optical or tactile measuring processes have been used, each having typical limitations. The tactile measuring principles are based essentially on contacting a workpiece surface by a probe body. This may cause a deformation of the surface, its soiling, or even its damaging. Optical measuring principles have other limitations which occasionally may likewise lead to difficulties. For example, problems may be encountered during the optical measurement of inclined surfaces and further, limitations of the measuring speed as well as measuring errors due to deflections at edges, etc. may occur.

GB 2144537 A discloses an optical profile measuring device based on confocal microscopy. The measuring device has a dot-like white light source and an object lens which concentrates on focal points the light precedingly transformed by a collimator into a parallel light beam. The distance of the focal points depends on the wavelength, due to the desired chromatic aberration of the object lens. The light reflected by the workpiece is again received by the object lens and guided by a beam splitter to a spectral analyzer which contains a row of photo diodes. The spectral analyzer causes the light to impinge on a certain location of the row of the photo diodes dependent on the received wavelength. From the position of the light dot falling on the row of the photo diodes, conclusions may be drawn as concerns the distance between the object lens and the workpiece surface.

This principle has been found to be well adapted for a rapid distance detection.

It is known from the same publication to oscillate the lens of the objective lens oriented toward the workpiece in the direction of its optical axis for causing a back-and-forth swinging of the focus in the measuring direction. Again, conclusions may be drawn from the oscillating signal as to the distance between the object lens and the workpiece surface.

U.S. Pat. No. 5,785,651 discloses a measuring device which is provided specially for measuring ocular lenses and which has several parallel-operating optical measuring systems each working as a confocal microscope. Each such confocal microscope comprises a polychromatic light source, an optical fiber serving as a dot screen, an object lens directing the light on the workpiece and receiving the light therefrom and having a substantial chromatic aberration, a beam splitter and a photo receptor which emits a signal characterizing the wavelength of the received light.

For detecting the form of curved bodies, such as an eye lens, a large number of individual sensors is required which are arranged in a matrix or in a row.

U.S. Pat. No. 5,804,813 discloses a confocal sensor provided for measuring a workpiece arranged on a piezoelectric actor. A coherent light source and an object lens with a high numeric aperture are used. For measuring the workpiece, the latter is moved transversely to the light beam of the sensor. The distance between the sensor and the surface of the workpiece slightly differs from the focal length of the object lens. The focal point of the object lens is situated slightly above or below the surface of the workpiece. The steep flank of the sensor signal during passage of the workpiece through the focal point is used as a measuring characteristic.

Such sensors have an extremely small depth sharpness. The measuring range is limited to a few nanometers.

It is accordingly the object of the invention to provide an optical sensor for measuring curved surfaces.

This object is achieved with the measuring device as defined in claim 1.

The measuring device according to the invention is based on a confocal sensor of the confocal microscope type provided with two photo receptors. The confocal sensor arrangement generates at least two focal points which are spaced from one another in the measuring direction and which may be produced with the same or different light colors as well as with the same or different polarization. The association of the photo receptors with the focal points is effected with the light color by means of a wavelength-differentiating band separator such as a spectrometer, a prism, by means of a wavelength-dependent reflector or the like. The differentiation of the focal points, or the association of the photo receptors with the focal points may also be effected by a spatial distancing of the photo receptors with respect to one another or by polarizing filters or other suitable means.

The measuring device comprises a difference-forming circuit which establishes the difference between the signals delivered by the two photo receptors. In this manner an approximately linear measuring range is obtained between two focal points. The differential signal extends, upon passage of the workpiece surface, in an approximately S shape through the region between the two focal points, and in the middle of the measuring range a zero signal may be defined. In this manner, on the one hand, the position of the workpiece surface in the middle of the measuring range may be determined very easily and simply and, on the other hand, all other surface positions lying within the measuring range may be detected very rapidly and without a mechanical adjustment of the measuring device. This opens the way to rapid measuring processes, on the one hand, and to the possibility of a significant measuring depth in the Z direction, on the other hand. Further, in this manner the differential signal is ideally adapted as a tracking signal for a regulating loop which causes the sensor arrangement to follow the surface contour in an analog manner or in steps. As a result, the possibility is provided for rapidly and accurately measuring in a contactless manner spatially extensive bodies, such as lenses, particularly aspherical lenses. The technical outlay in this connection is small. A simple and robust measuring system is obtained which is flexibly adaptable to various workpiece sizes and shapes.

The confocal sensor arrangement is preferably connected to a two-axis positioning device. While one of the axes is present in a feeding device as a tow axis and is essentially parallel to the workpiece surface, the other axis is oriented essentially perpendicularly thereto. The parallel axis serves for defining a measuring path, as in a sectional scanning measuring process. In the latter the workpiece surface is scanned by a probe along a line. The perpendicular axis serves for the tracking of the confocal sensor arrangement, so that the curved workpiece surface always remains in its measuring range. Such an axis may be formed, for example, by a long pivotal arm which carries the sensor arrangement. The pivotal arm extends approximately parallel to the workpiece surface. It is connected to a positioning device which is held continuously at a constant distance, or within a tolerance-constant distance from the measuring point or the workpiece surface by a proportional control device or a two-point control device. The tolerance is less than the measuring range.

In principle, different constructions of the confocal sensor arrangements may find application. In the simplest case this is based on a non-coherent or short-coherent, at least two-colored light source which is connected to the object lens by a fiber coupler. The fiber coupler further connects the object lens with a spectrometer which has at least two photo receptors, whose output signals are applied to a differential amplifier. The generated differential signal (intensity-differential signal) may serve as a measuring signal and/or as a setting signal for the first positioning device. The latter guides the sensor arrangement toward or away from, the workpiece surface. A further sensor detects the position of this positioning device and thus detects the position of the sensor arrangement. This may be effected, for example, by an interferometric or incremental measuring system. The measuring signal is then obtained by adding the position signal of the first positioning device to the signal delivered by the sensor arrangement. In case the sensor arrangement is continuously tracked to the middle of the measuring range (in case of the proportional control device as defined in claim 7), the position signal of the positioning device may also serve as the sole measuring signal.

Further details of advantageous embodiments are contained in the drawing, the description or the claims.

In the drawing, which shows embodiments and exemplary applications of the invention, FIG. 1 is a schematic, basic illustration of a measuring device, FIG. 2 shows the measuring device of FIG. 1 while measuring the shape of a workpiece, FIG. 3 illustrates a first basic embodiment of the sensor arrangement of the measuring device according to FIG. 1, FIG. 4 is a basic illustration of a modified embodiment of a sensor arrangement having two monochromatic light sources, FIG. 5 is a basic illustration of an embodiment of a sensor arrangement operating with differently polarized light, FIG. 6 shows the intensity curve of a signal emitted by a photo receptor upon passage of the workpiece surface through the focal point associated therewith, FIG. 7 illustrates the differential signal obtained by subtraction of two photo receptors associated with two spatially distanced focal points, during passage of the workpiece surface through the focal points, FIG. 8 is a block diagram of the control device according to a first embodiment as a proportional control device and FIG. 9 is a block diagram of the control device according to an embodiment as a two-point control device.

FIG. 1 illustrates a measuring device 1 used for measuring a workpiece 2. The measuring may be a roughness measuring, a shape measuring or a contour measuring. Different measuring tasks may also be effected, by performing, for example, both a roughness measurement and a shape measurement.

The measuring device 1 comprises an optical sensor in the form of a confocal sensor arrangement 3, whose structure will be described later in conjunction with FIGS. 3 to 5. The sensor arrangement 3 which is used for scanning the upper surface of the workpiece 2 in a contact-less manner, is carried by an arm 4 which, as compared to the measuring path, is relatively long and is oriented essentially parallel to the surface of the workpiece 2. The arm 4 is pivotally supported at a pivot point 5 by a sled. The possible pivotal motion of the arm 4 is shown by an arrow 7 in FIG. 1. This defines the arcuate direction of motion of the sensor arrangement 3 which essentially is identical to the measuring direction of the sensor arrangement 3 indicated by an arrow 8.

On the other hand, the sled 6 is movable along a guiding device 9 transversely to the measuring direction 8, approximately in the longitudinal direction of the arm 4. This motion is indicated by an arrow 11 in FIG. 1. For shifting the sled 6 along the guiding device 9, an only schematically shown driving device 12 is provided which constitutes a second positioning device for the sensor arrangement 3. On the other hand, a first positioning device 13 serves for a controlled pivotal motion of the arm 4 about the pivot point 5. The positioning device 13 is constituted, for example, by a plunger coil drive which is controlled by a control device 14. For an accurate detection of the pivotal position of the arm 4, a position sensor 15 is provided which is, for example, an Interferometric sensor or an incremental measuring system. The position sensor 15 is connected to the control device 14. Similarly, the sensor arrangement 3 is connected to the control device 14 by a conductor 16.

A first embodiment of the sensor arrangement 3 is shown in FIG. 3. The sensor arrangement 3 comprises a sensor head 16 which is disposed at a free end of the arm 4 (FIG. 1). The sensor head 16 is connected by an optical fiber 17 and a fiber coupler 18, which acts as a beam splitter, to a light source 19 and a light receptor 21. The light source 19 is an at least bi-chromatic light source, preferably a light source which emits a continuous spectrum, such as an incandescent lamp or the like. Other light sources may also find application which generate at least two light colors. The light emitted by the light source 19 is coupled into the branch 22 of the optical fiber 17, leading from the fiber coupler 18 to the light source 19.

The light receptor 21 is wavelength sensitive. It comprises, for example, a prism or an optical grid 23. The light reflected by the surface of the workpiece 2 and again received by the sensor head 16 is directed by a branch 24 of the optical fiber onto the grid 23 and from the latter, onto a group of photo receptors 25, 26, 27 which are spatially distanced from one another. Their output signals are applied to a computing circuit 28.

The light receptor 25 generates the output signal U1, the light receptor 26 generates the output signal U2 and the light receptor 27 generates the output signal U3. The photo receptors are disposed relative to the optical grid 23 such that the middle photo receptor 26 receives the light having the wavelength $\lambda 0$. The photo receptors 25 and 27 arranged on either side, receive light having a wavelength $\lambda 0 - \Delta \lambda$ and, respectively, $\lambda 0 + \Delta \lambda$. The output voltages U1 and, respectively, U2 have their maximum magnitude precisely at these wavelengths. The distances of the photo receptors 25 to 27 as well as the wavelengths and the measuring range of the sensor head 16 are coordinated with one another in such a manner that the measuring range of the sensor head 16 and the wavelength range are preferably approximately the same as the half width magnitude (FWHM) of the confocal signal. In this connection reference is made to FIG. 6 which illustrates the curve of the voltage U2 at the photo receptor 26 during a motion of the sensor head 16 in the direction of its optical axis 29. In case the surface of the workpiece 2 passes through the focal point 31 associated with the photo receptor 26, the output signal U2 passes through a maximum. The voltage signal curve is bell-shaped. The curve of the voltage U2 is also referred to as a confocal signal. The deviation h from the middle of the measuring range is referred to as the height position. The actual height magnitude may be computed based on the wavelength $\lambda 0$ as well as $\Delta \lambda$ from the output voltages U1 to U3 in accordance with the below-defined relationship, since it is proportional to the light wavelength $\lambda$. The latter is calculated in accordance with the relationship $$\lambda = \lambda_0 + \frac{\Delta\lambda}{2} \frac{\ln(U1) - \ln(U3)}{\ln(U1) - 2\ln(U2) + \ln(U3)}$$

The sensor head 16 comprises an object lens 32 having a collimator lens 33 and a focusing lens 34. The end face of the optical fiber 17 acts as a dot-like light source. The object lens 32 has a high chromatic aberration and generates variously colored focal points 35, 31, 36 along the optical axis 29. The length of the range occupied by the focal points 35, 36 on the optical axis 29 is determined by the chromatic aberration of the object lens 32 and the maximum frequency difference $\Delta F$ in the light of the light source 19. If the latter has a continuous spectrum, a line-shaped focal point range is formed on the optical axis 29. The photo receptors 25, 26, 27 are each associated with a selected spectral line and thus with a focal point of the selected light color lying in the focal range. The output voltages of the photo receptors 25 and 27 correspond to the output signal U2 shown in FIG. 6.

The computing circuit 28 can deliver, by means of the evaluation strategy presented by the above formula, a measuring signal which characterizes the distance between the object lens 32 and the workpiece surface. Further, the computing circuit may be part of the control device 14 and, for that purpose, have blocks which are shown in FIG. 8 and which constitute a tracking circuit in the form of a proportional control device 37. The latter has at least one differential amplifier 38 having a non-inverting input 39 and an inverting input 41, as well as an output 42 to which the positioning device 13 is connected. The photo receptors 25, 27 are connected to the inputs 39, 41. The differential amplifier 38 may have a linear characteristic curve or, as shown in FIG. 7, a characteristic curve which is bent in a slightly S shape.

The measuring device 1 described up to this point operates as follows:

During operation, first the measuring device 1 is positioned such that the sensor arrangement 3 floats above the location of interest of the workpiece 2. By actuating the first positioning device 13, the arm 4 is then lowered to such an extent until the upper surface of the workpiece 2 arrives in the region, designated at $\Delta F$, between the focal points 35, 36 shown in FIG. 3. The light reflected from the surface is received by the object lens 32. Only that light impinges on the dot-like aperture of the optical fiber 17, whose focal point meets the surface of the workpiece 2. This light component is uncoupled onto the branch 24. The grid 23 deflects the light delivered by the branch 24 in accordance with its wavelength. In this manner, it impinges, corresponding to its wavelengths, on a location of the row formed by the photo receptors 25 to 27. The computing circuit 28 now determines, in accordance with the above formula, the exact height position of the scanned surface point. At the same time, the proportional control device 37 generates a signal for controlling the first positioning device 13. This occurs by a difference formation of the output voltages U1, U3 (FIG. 8). The output voltage UA of the differential amplifier 38 has the course shown in FIG. 7 for the different positions of the workpiece surface within the range $\Delta F$ in FIG. 3. On either side of the mid position 43, the output signal UA depends essentially linearly from the deviation $\Delta h$ of the workpiece surface from the mid position.

The output signal UA is applied to the positioning device 13, so that the latter guides the sensor head 16 essentially at a constant distance from the surface of the workpiece 2. In any event, it keeps the surface of the workpiece within the measuring range $\Delta F$ even if, at the same time, the second positioning device 12, is actuated for scanning the surface of the workpiece 2 along a line. The signal delivered by the computing circuit 28 and the position signal of the position sensor 16 are then added for determining therefrom the real magnitude of the height of the measured point of the surface in the Z direction (arrow 8 in FIG. 1).

With this method and with the measuring device 1, workpieces, such as aspherical lenses 44 may be measured. In the example according to FIG. 2, the lens 44 is mounted on a turntable 45. Upon rotation of the latter, the sensor arrangement 3 scans a circular region of the surface of the lens 44. The second positioning device 12 may be at rest during this step. The first positioning device 13 causes the sensor arrangement 3 to follow the elevations and depressions of the surface of the lens 44. In the alternative, the turntable 45 may be stationary, and the driving device 12 may be activated for verifying the curvature of the lens 44 at suitable meridians. If required, the turntable 45 and the second driving device 2 may be simultaneously activated.

FIG. 9 shows an alternative embodiment of a control device for actuating the positioning device 13. The control device is a two-point control device 46 and is connected to the photo receptors 25, 27 and thus to the output voltages U1, U3. Its differential amplifier 38 is, however, is not connected directly with its output 42 to the positioning device 13. Rather, the output 42 is connected to a threshold value switch 47 which emits a positive output signal only if its input signal exceeds a positive threshold 48. It emits a negative output signal if its input signal falls below a negative threshold 49. Otherwise its output signal is 0. A step-inputting device 51 is after-connected; it prescribes for the positioning device 13 a positive positioning step if it receives a positive input signal. Upon receipt of a negative input signal, it prescribes a negative positioning step for the positioning device 13.

Such a two-point control device 46 causes the sensor arrangement 3 to follow the surface contour of the workpiece 2 in a step-shaped track. Obtaining the measuring magnitude again occurs by adding the position signal of the position sensor 15 to the signal emitted by the computing circuit 28.

The computing circuit 28 and the evaluating algorithm performed thereby is particularly advantageous concerning critical local surface properties of the workpiece 2. For example, the local surface slope or the micro structure of the surface may vary. This leads to a changing slope of the linear portion of the curve according to FIG. 7 and thus renders difficult the exact association of an output voltage magnitude UA with the height position of the belonging surface point of the workpiece 2. Such an association is assumed by the computing circuit 28 based on at least three photo receptors 25, 26, 27. In the alternative, additional photo receptors may be used for increasing the resolution. In such a case, equations have to be used that correspond to the above-given computing rule. In case of N photo receptors, the course of the signal (occasionally first expressed logarithmically) is approximated by a polynomial of the order N−1. The position of the maximum of such polynomial behaves proportionately to the height magnitude searched for. For applications in which a low resolution suffices, or the micro structure or the slope change of the surfaces to be measured is not critical, the computing circuit 28 may be connected only to two photo receptors 25, 27. Furthermore, the computing circuit 28 may in such a case be replaced by the differential amplifier 38.

FIG. 4 shows a further embodiment of the sensor arrangement 3. The object lens 32 is identical to the precedingly described object lens 32 of FIG. 3; accordingly, reference is made to the preceding discussion.

The light source 19 is constituted by two monochromatic light emitting diodes 52, 53 which are connected to the branch 22 of the optical fiber 17 by a fiber coupler 54. The light emitting diodes 52, 53 emit different light colors; they may be laser diodes or ordinary light emitting diodes.

The light receptor 21 may be of a construction as shown in FIG. 3. It may, however, as shown in FIG. 4, be provided with a wavelength-dependent reflector 55 instead of the optical grid 23. This applies particularly if the wavelengths of the light emitting diodes 52, 53 substantially differ from one another. The photo receptors 25 and 27 are connected to the different outputs of the reflector 55, and the photo receptors 25, 27 are, in turn, coupled to the differential amplifier 38. The latter generates the signal according to FIG. 7 which acts as a tracking signal for the positioning device 13. Furthermore, it also may serve as a measuring signal.

A further modified embodiment of the sensor arrangement 3 is illustrated in FIG. 5. In this connection, based on the same reference numerals, reference is made to the earlier description. As a departure therefrom, however, between the light outlet opening of the optical fiber 17 and the lens 33 a beam splitter 56 is disposed which allows straight passage of light of a predetermined polarization. A further optical fiber 57 is provided radially to the optical axis 29. The beam splitter 56 reflects light, whose polarizing plane is perpendicular to the light of the of the optical fiber 17, in the direction parallel to the optical axis 29. The optical fiber 57 is connected by a fiber coupler 58 to the light source 19 which may be a monochromatic or a polychromatic light source. The fiber coupler 58 divides the light emanating from the light source 19 between the optical fibers 17, 57.

While the fiber coupler 18 guides the light, received again by the optical fiber 17, to the photo receptor 25, to the optical fiber 57 a fiber coupler 58 is connected which guides the received light to the photo receptor 27. The photo receptors 25, 27 are, in turn, coupled to the differential amplifier 38.

The distance of the light exit opening of the optical fiber 17 from the beam splitter 56 differs from the distance of the light exit opening of the optical fiber 57 from the beam splitter 56. When using monochromatic light, the distance difference defines the length of the measuring range ΔZ. In case polychromatic light is used, for example, a light of two light emitting diodes, or a light having a continuous spectrum, the focal points 35, 36 degenerate into long, colored focal lines which may intersect or touch one another. In such a case it is advantageous to provide that the photo receptors 25, 27 generate a wavelength-dependent signal, for example, by including a deflecting grid or a prism and by dividing the respective photo receptor 25, 27 into a row of individual receptors. In such a case the object lens 32 has a chromatic aberration. A computing circuit 28 may be again connected to the divided individual rows of the photo receptors 25, 27 in accordance with FIG. 3. Such a computing circuit may be responsible merely for photo receptor groups derived from the photo receptor 25 or from the photo receptor 27. It may also process the signals of all the photo receptors.

A measuring device 1 for measuring the shape, contour and/or roughness of a workpiece is based on a contact-less optical probe having a large numeric aperture. The probe has at least two different focal points with which at least two photo receptors 25, 27 are associated. The latter generate a differential signal for controlling a positioning device 13 for tracking the optical probe in such a manner that the workpiece surface is maintained within the measuring range of the probe. The differential signal was found to result in a rapid and accurate tracking of the position of the sensor arrangement 3.

The invention claimed is:

1. A measuring device for measuring the shape and/or roughness of workpiece surfaces, comprising
    a confocal sensor arrangement including at least one light source and an object lens which generates at least two spatially distanced focal points, as well as at least two photo receptors which are associated with the different focal points;
    a first positioning device connected to the confocal sensor arrangement and having a first positioning direction essentially identical to a measuring direction of the measuring device;
    a second positioning device connected to the confocal sensor arrangement and having a second positioning direction oriented essentially perpendicularly to the measuring direction of the measuring device, wherein the second positioning device forms part of a feeding device having a pivotal arm and an angle indicator or a position sensor, and wherein the pivotal arm carries the sensor arrangement; and
    a computing circuit, whose inputs are connected to the photo receptors and which generates at its output a differential signal serving for a distance measurement.

2. The measuring device as defined in claim 1, wherein the magnitude of that differential signal which is generated when the workpiece surface is situated between the focal points, is defined as the zero point.

3. The measuring device as defined in claim 1, wherein the differential signal serves as a tracking signal for the first positioning device.

4. The measuring device as defined in claim 1, wherein the first positioning device is connected to a proportional control device.

5. The measuring device as defined in claim 1, wherein the first positioning device is connected to a two-point control device.

6. The measuring device as defined in claim 1, wherein the light source is an at least two-color light source and that the object lens has a chromatic aberration.

7. The measuring device as defined in claim 6, wherein the light source has a continuous spectrum.

8. The measuring device as defined in claim 6, wherein the light source comprises at least two monochromatic, individual light sources.

9. The measuring device as defined in claim 6, wherein a spectrometer is connected before the photo receptors.

10. The measuring device as defined in claim 6, wherein a wavelength-selective reflector is connected before the photo receptors.

11. The measuring device as defined in claim 1, wherein the light source is a monochromatic light source.

12. The measuring device as defined in claim 1, wherein the sensor arrangement includes a polarizing optical beam splitter.

13. The measuring device as defined in claim 12, wherein the beam splitter is disposed in the object lens and is coupled thereto by two fibers, whose light exit faces are at unlike distances from the beam splitter.

* * * * *